United States Patent
Li et al.

(10) Patent No.: US 6,463,177 B1
(45) Date of Patent: *Oct. 8, 2002

(54) DYNAMIC MANAGEMENT OF EMBEDDED CODED IMAGES IN A DIGITAL STORAGE DEVICE

(75) Inventors: Jin Li, Vancouver; Shaw-Min Lei, Camas, both of WA (US)

(73) Assignee: Sharp Laboratories of America, Inc., Camas, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,343

(22) Filed: Nov. 4, 1998

(51) Int. Cl.⁷ .................................................. G06K 9/36
(52) U.S. Cl. ........................................ 382/232; 382/240
(58) Field of Search ................................ 382/232, 233, 382/240, 246, 248, 239; 341/51, 79, 107; 348/390, 400, 405, 417, 418, 422, 699; 707/100, 101, 102, 104.1

(56) References Cited

U.S. PATENT DOCUMENTS

| | | | |
|---|---|---|---|
| 5,159,681 A | * 10/1992 | Beck et al. ............... 395/425 |
| 5,416,560 A | 5/1995 | Taka ........................ 396/287 |
| 5,444,482 A | 8/1995 | Misawa et al. ............ 348/220 |
| 5,459,819 A | 10/1995 | Watkins et al. ........... 358/1.18 |
| 5,463,419 A | 10/1995 | Saito ........................ 348/233 |
| 5,475,539 A | 12/1995 | Orii ......................... 386/118 |
| 5,477,264 A | 12/1995 | Sarbadhikari et al. .... 348/231 |
| 5,481,653 A | 1/1996 | Kashiwagi et al. ....... 348/418 |
| 5,502,778 A | 3/1996 | Ishikawa et al. .......... 382/239 |
| 5,526,047 A | 6/1996 | Sawanobori ............... 348/222 |
| 5,528,293 A | 6/1996 | Watanabe ................. 348/231 |
| 5,530,793 A | 6/1996 | Watkins et al. ........... 358/1.18 |
| 5,534,921 A | 7/1996 | Sawanobori ............ 348/333.01 |
| 5,553,277 A | 9/1996 | Hirano et al. ............ 707/104.1 |
| 5,563,655 A | 10/1996 | Lathrop .................... 348/231 |
| 5,576,757 A | 11/1996 | Roberts et al. ........... 348/207 |
| 5,576,758 A | 11/1996 | Arai et al. ................ 348/220 |
| 5,619,257 A | 4/1997 | Reele et al. ................ 348/64 |
| 5,619,265 A | 4/1997 | Suzuki et al. ............. 348/362 |
| 5,619,598 A | 4/1997 | Nagata et al. ............. 382/305 |
| 5,633,678 A | 5/1997 | Parulski et al. ........... 348/232 |
| 5,646,684 A | 7/1997 | Nishizawa et al. ........ 348/231 |
| 5,659,635 A | 8/1997 | Komatsu et al. .......... 382/245 |
| 5,666,160 A | 9/1997 | Hwang .................... 348/240 |
| 5,677,689 A | 10/1997 | Yovanof et al. ........... 341/50 |
| 5,680,486 A | 10/1997 | Mita et al. ................ 382/232 |
| 5,748,786 A | * 5/1998 | Zandi et al. .............. 382/240 |

OTHER PUBLICATIONS

Wiegand et al. (Rate–Distortion Optimized Mode Selection for Very Low Bit Rate Video Coding and the Emerging H.263 Standard, IEEE Transactions on Circuits and Systems for Video Technology, vol. 6, No. 2, Apr. 1996, pp.: 182–190).*

* cited by examiner

*Primary Examiner*—Leo Boudreau
*Assistant Examiner*—Duy M. Dang
(74) *Attorney, Agent, or Firm*—Marger Johnson & McCollom, PC

(57) ABSTRACT

An embedded coding scheme is used to dynamically changes the size of compressed images and as a result image quality according to the number of stored pictures. As more images are captured, the image storage device makes room for newly captured images by truncating existing compressed embedded coded bitstreams of previously stored images. The embedded digital image storage device can thus store a virtually unlimited number of images by dynamically trading-off between the number of stored images and image quality.

18 Claims, 5 Drawing Sheets

DYNAMIC MANAGEMENT OF EMBEDDED CODED IMAGES IN A DIGITAL STORAGE DEVICE

BACKGROUND OF THE INVENTION

This invention relates to storing images in an image storage device and more particularly to dynamic management of embedded coded images.

Image compression using current JPEG standards can reduce the number of bits required to store the digitized images by encoding and quantizing the images at certain compression ratios. The compressed images use less memory but have the disadvantage of lowering image quality. Because each image is compressed at the same compression ratio, each image has the same image quality regardless of the amount of available memory in the image storage device.

Memory storage devices, such as digital cameras, can only store a limited number of pictures in a regular-quality mode and can store even fewer pictures in a high-quality mode. The number of stored pictures is usually fixed for each mode. If memory in the storage device is fall, newly captured images must either be discarded or previously stored images must be discarded to make room for the new images.

A user may want the option to take only one picture at the highest possible image quality or the option of taking multiple pictures at lower image quality. If the first pictures taken are compressed to conserve memory space, it is not then possible to convert these compressed images to a higher image quality, even if only one or two pictures are ever taken.

Accordingly, a need remains for a simple dynamic memory management system that maintains the highest possibly image quality for the number of images currently stored in memory.

SUMMARY OF THE INVENTION

The invention utilizes an embedded coding scheme to dynamically change the size of compressed images according to the number of stored pictures. A storage-limited device, such as digital camera, captures and converts images into embedded bitstreams. The images are initially stored as high quality images at low compression ratios to fully utilize available memory.

Room for a newly captured image is provided by truncating the existing embedded coded bitstreams of the previously stored images. The newly captured image is then encoded to fit into the space truncated from the currently stored images. The image storage device stores a virtually unlimited number of images by dynamically trading-off between the number of stored images and the image quality of each image.

Bitstreams encoded using an embedded image coding scheme can be truncated at arbitrary locations. As a result, the number and size of images stored in the memory device can be adaptively adjusted without having to decode and reencode the existing stored images. The amount of memory allotted for each stored image can then be more easily and quickly varied according to the available memory space.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
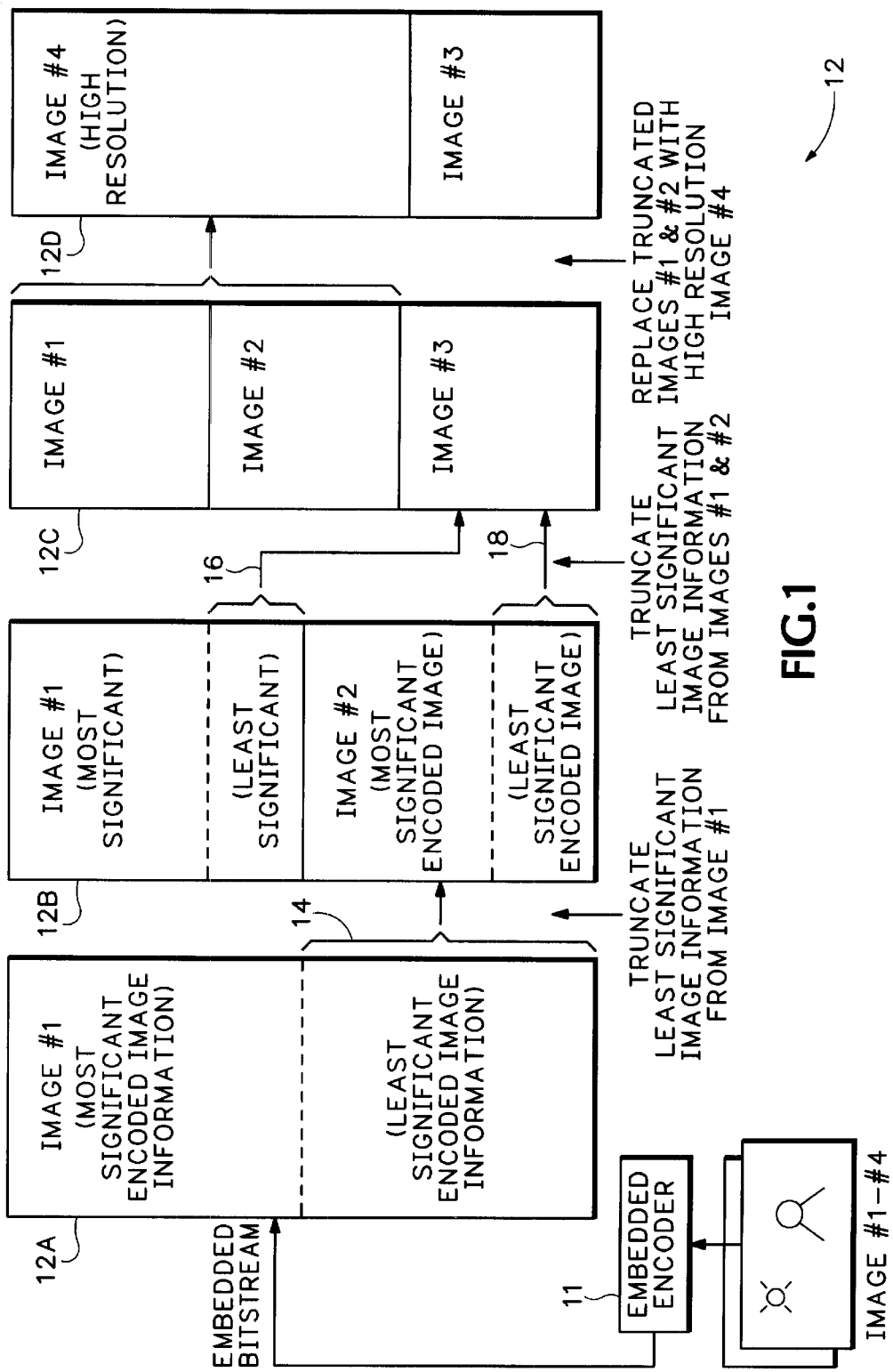
FIG. 1 is a schematic diagram showing how embedded coded images are dynamically allocated memory according to the invention.

A memory 12 is shown with different configurations 12A–12D of stored images according to the invention. Memory 12 in configuration 12A stores a single image #1 that has been compressed into an embedded bitstream using an embedded encoder 11. The coarseness (image quality) of the image depends on the memory available.

The embedded coded bitstream for image #1 is generated in the order of information significance. In other words, the bitstream is encoded so that the most significant bits for each coefficient are sent first then followed by the next most significant bits of each coefficient, etc. Embedded coding allows the bitstream to be truncated at any point and still maintain the most significant image information with the remaining bits. Thus, even a highly truncated image bitstream can provide a coarse representation of the image.

One embedded coding technique that can be used in the embedded coder 11 is Rate-distortion Optimized Embedded (RDE) coding. This technique is disclosed in U.S. patent application Ser. No. 09/016,571, "An Embedded Image Coder with Rate-Distortion Optimization", filed Jan. 30, 1998, by J. Li and S. Lei, which is incorporated herein by reference. However, the invention can be implemented with any embedded coding scheme that allows arbitrary truncation of an image bitstream. Embedded coding techniques currently exist for wavelet-based coding algorithms and for Discrete Cosine Transform (DCT)-based coding algorithms and are therefore not described in detail.

Since the entire memory 12 is initially empty, image #1 may not have to be truncated at all or may only have to be truncated a small amount (small compression ratio). Image #1 therefore maintains high image quality when decoded and displayed from the memory configuration 12A. Memory 12 might have room to store more than one entire nontruncated image at the same time. For illustrative purposes, image #1 is shown completely filling memory 12.

When a second image #2 is stored in the memory configuration 12B, the least significant portion 14 of previously stored image #1 is truncated to make room for the new image #2. Image #2 is encoded by embedded encoder 11 by an amount necessary to fit into the space 14 made available by truncating the bitstream of image #1. For example, the least significant half of the image information for image #1 is truncated. The most significant half of the image information for image #2 is then stored in the truncated space 14 from image #1.

The stored images are further truncated each time another image is received by the image storage device. For example, the least significant portion 16 of the embedded bitstream for stored image #1 is truncated again in memory configuration 12B to make room for a third image #3. The least significant portion 18 of the embedded bitstream for image #2 is also truncated in memory configuration 12B to make room for a portion of the embedded bitstream for image #3.

A user, therefore, has the option to take fewer high quality images with little or no truncation (memory configuration 12A) or more lower quality images with a higher compression ratio (memory configurations 12B or 12C). Because the images #1, #2 and #3 are encoded into embedded bitstreams, each image can be arbitrarily truncated at the end to make room for additional images. To change compression ratios using other compression techniques, the stored images would first have to be decoded, then requantized and then reencoded at the higher compression ratio. The recompressed images would then have to be restored into memory 12. The embedded encoding technique described above allows less complex memory management system to dynamically allocate memory for new images.

Dynamic memory allocation according to the invention is used with a variety of different user selectable image storage options. For example, a user can select one or more exiting stored images to be replaced with a new image. Images #1 and #2 in memory configuration 12C, for example, are selected to be replaced with the encoded bitstream for a new image #4 in memory configuration 12D. Because image #4 is encoded into an embedded coded bitstream, the bitstream for image #4 is easily truncated to the size necessary to fit into the memory space previously occupied by images #1 and #2. Because, the user selected two images #1 and #2 for replacement, image #4 is truncated less than image #3 and, in turn, retains more image resolution (higher image quality).

A user may also select a maximum truncation threshold value for one or more of the images. For example, image #4 can be selected by the user not to be truncated beyond that shown in memory configuration 12D. Nonselected images such as image #3, and subsequently stored images are then truncated equally to make room for newly acquired images. A second maximum truncation threshold value can be configured into the system to automatically prevent the stored images from being truncated below some minimum image quality level.

Figure 2:
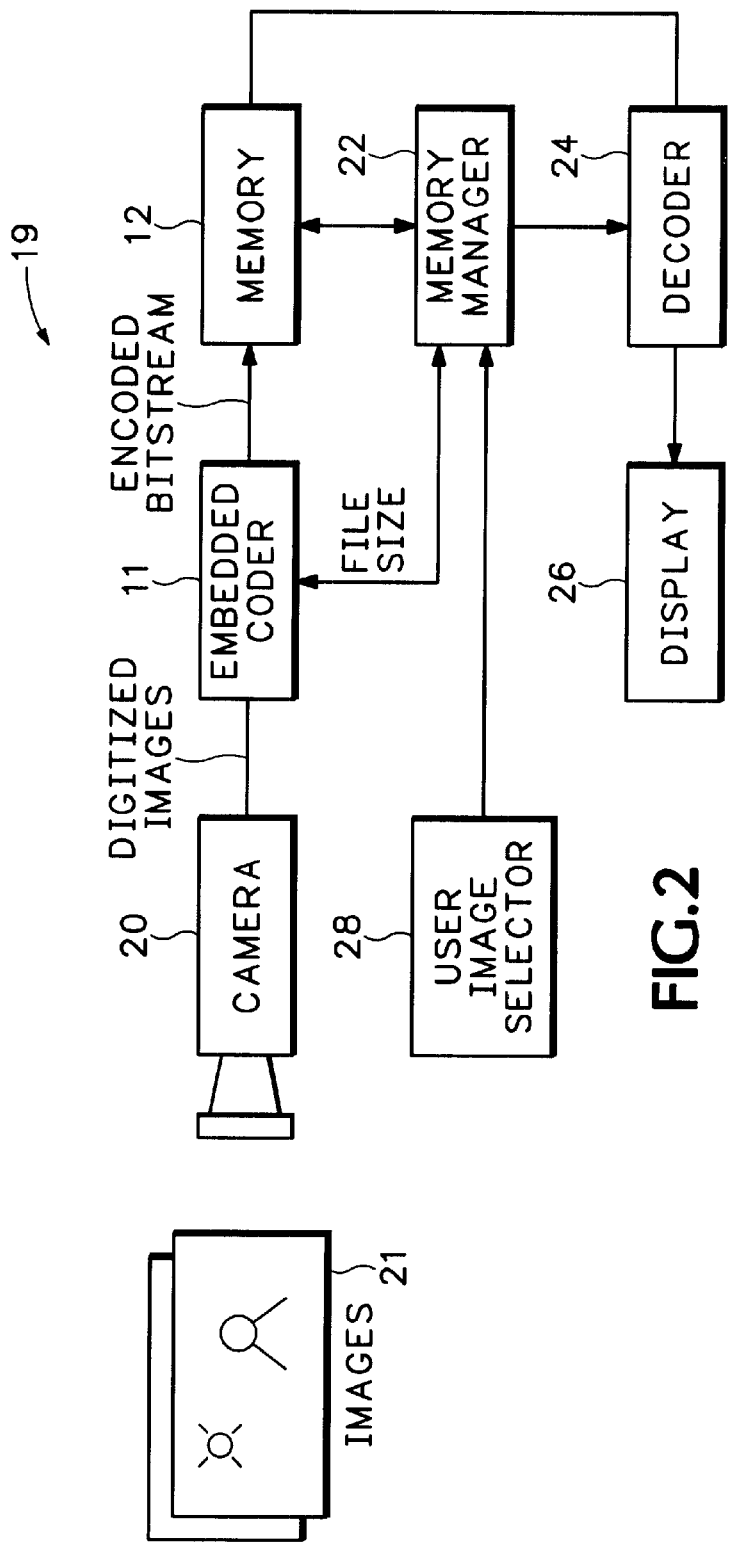
FIG. 2 is a block diagram of an image storage device using the dynamic memory allocation shown in FIG. 1.

Referring to FIG. 2, a memory manager 22 according to the invention is integrated into an image storage device, such as a digital camera 19. The same memory manager 22 is adapted for integration into other image storage devices such as personal computers. A camera 20 captures images 21. An embedded coder 11 receives digitized images from the camera 20. The embedded coder 11 encodes and truncates the received images according to a file size specified by the memory manager 22. The truncated encoded images are stored in memory 12 at memory locations specified by memory manager 22. User image selections are received by an user image selector 28 and fed to the memory manager 22. User image selector 28 allows the user to select images for replacement with new images, limit truncation for selected images, etc.

The user through user image selector 28 selects one or more of the images in memory 12 for display. The memory manager 22 sends the selected image from memory 12 to decoder 24. Decoder 24 decodes the truncated embedded coded image and then outputs the decoded image to a display 26. The embedded coder 11 and decoder 24 can be implemented using any one of a variety of existing embedded coding schemes, such as the Rate-Distortion Optimized Embedded (RDE) coder described above.

Figure 3:
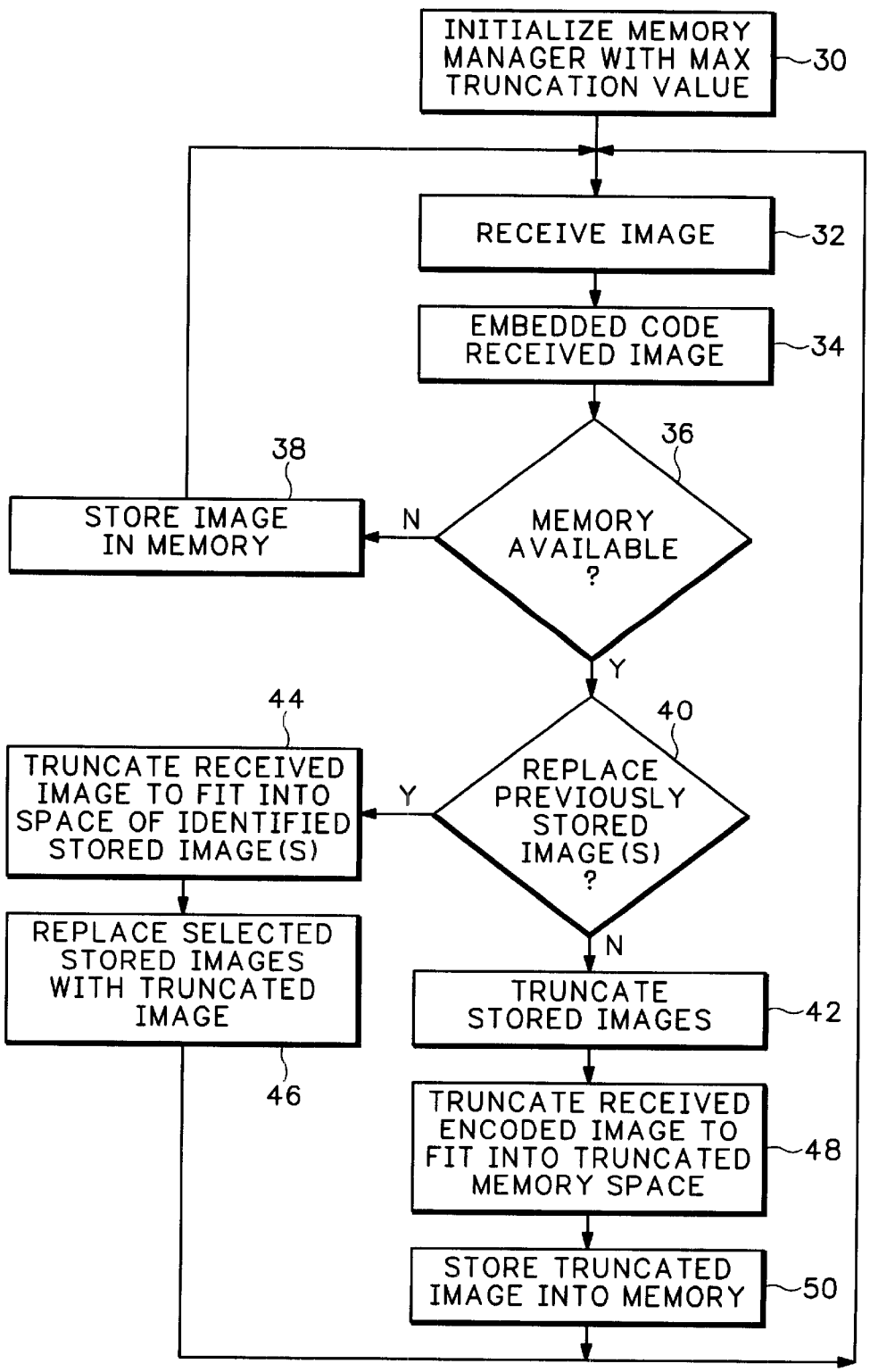
FIG. 3 is a flow diagram showing how a memory management system operates in the image storage device of FIG. 2.

FIG. 3 is a flow diagram describing in more detail how the memory manager 22 operates. The memory manager 22 is initialized in step 30 with a maximum truncation value. Images cannot be truncated beyond this maximum truncation value preventing the stored images from being truncated below some minimum image quality level. The images are received in step 32 and embedded coded in step 34. Decision step 36 determines if there is memory available to store a newly received image. If sufficient memory is available, the image is stored in step 38. The memory manager 22 then waits to receive the next image in step 32.

If there is insufficient memory, decision step 40 first determines if there has been any previous user input that has tagged any previously stored images for replacement. If the user has selected to replace one or more previously stored images, step 44 truncates the received image, if necessary, to fit into the space of the selected images. Step 46 then replaces the selected images in memory with the newly received image.

If the user does not select any stored images for replacement, stored images are truncated in step 42. The memory manager 22 can truncate images specifically selected by the user through the user image selector 28. Alternatively, all the images are all truncated equally when the user does not select any stored images for truncation. The newly received encoded image is truncated in step 48 to fit into the memory space made available by truncating the previously stored images. The memory manager 22 stores the newly received image in memory in step 50 and then returns to step 32 to receive the next image.

Figure 4:
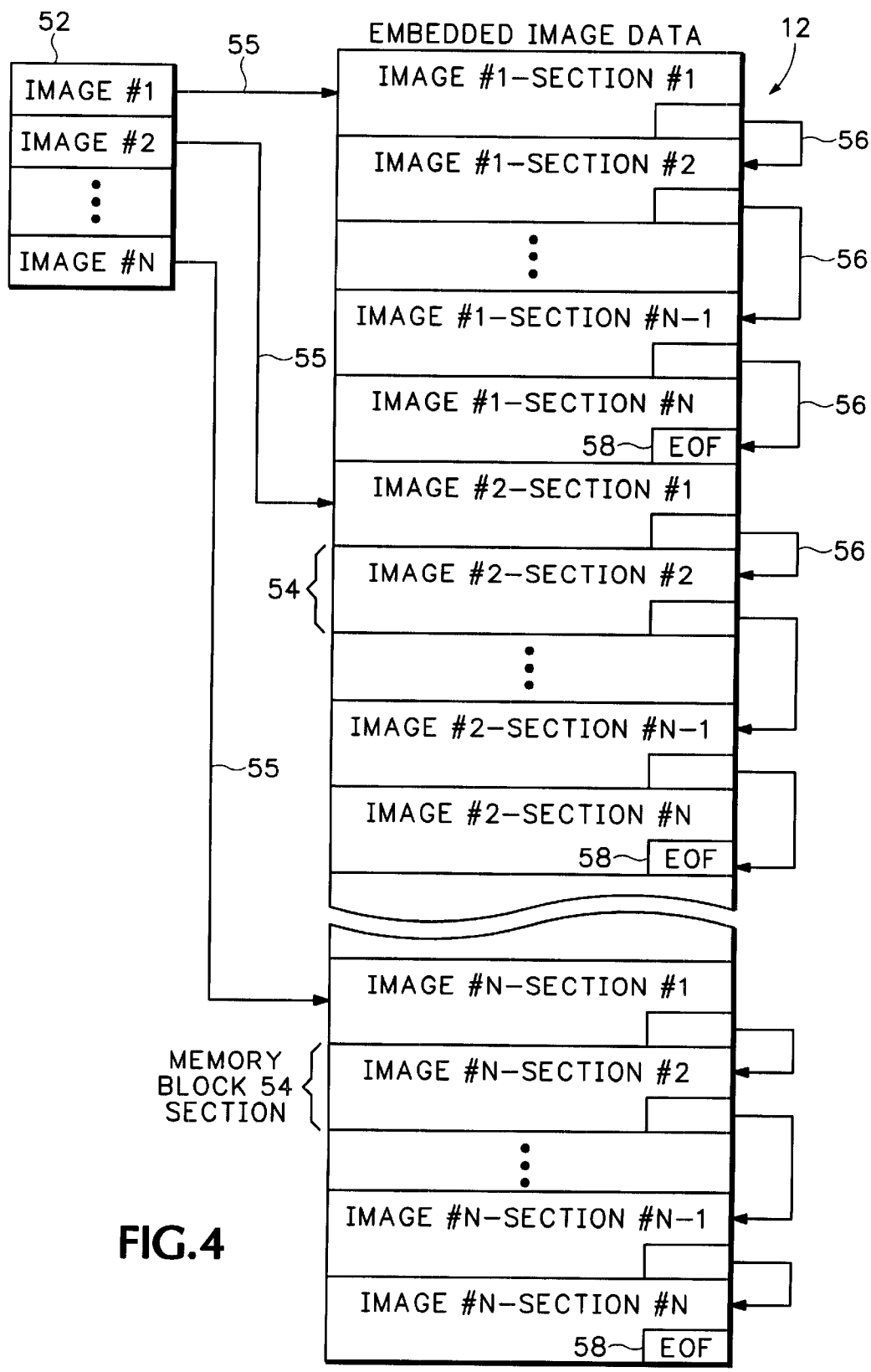
FIGS. 4 and 5 are schematic diagrams showing one example of how compressed images are truncated.
Figure 5:
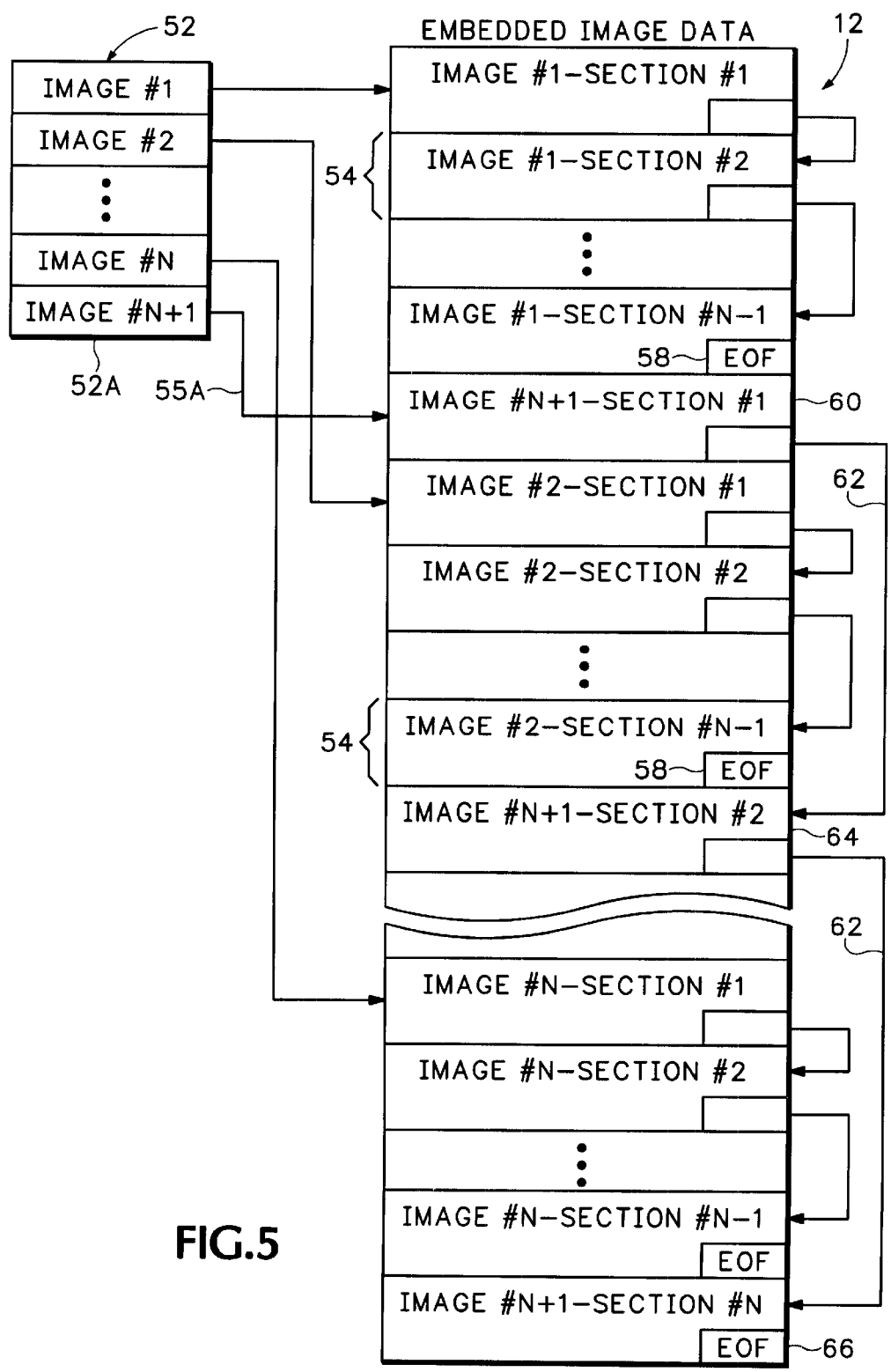

Referring to FIGS. 4 and 5, the memory manager 22 dynamically truncates the multiple images in memory 12. In one example, the memory manager 22 truncates the stored images using a directory indexing scheme similar to that used to locate files on a personal computer hard disk. A directory 52 identifies the images currently stored in memory. Each entry in directory 52 includes a pointer 55 to a beginning memory block section 54 for one of the stored images. Each memory block section 54 also has an associated pointer 56 that indicates the next memory block section containing another portion of the same image. The last memory block section 54 for each image is identified with an End of File (EOF) tag 58.

FIG. 4 shows a variable number of images #1–#N already stored in memory 12. Stored images #1–#N each has multiple memory block sections #1–#N. FIG. 5 shows how the existing stored images #1–#N are dynamically truncated to allow storage of an additional image #N+1. Referring to FIG. 5, an entry 52A is added to directory 52 for the new image #N+1. The EOF tags 58 are moved up one or more memory block sections in each one of the currently stored images #1–#N. For illustration purposes, the EOF tags 58 for images #1–#N are each moved up one from the last memory block section #N to the next to last memory block section #N–1.

The directory pointer 55A for new received image #N+1 points to the memory block section 60 that was previously the last memory block section for image #1. A pointer 62 for memory block section 60 points to the truncated memory block section 64 previously linked to image #2. The remaining pointers 62 for the newly received image #N+1 link to the memory block sections that previously were the last links in the previously stored images. The embedded bitstream for image #N+1 is then stored in the truncated memory block sections 60, 64, 66, etc. Other existing memory management schemes can similarly be used to track the beginning and ending location of truncated images in the image storage device.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for managing the storage of multiple different images in an image storage device, comprising:

an embedded coder encoding the multiple different images into separate embedded encoded bitstreams;

memory storing the encoded bitstreams for the multiple different images; and a memory manager interacting between previously encoded and stored images and new images where dynamic truncation is performed on the previously stored images to accommodate the new images by dynamically varying truncation of the previously stored embedded encoded bitstreams for multiple ones of the different images and storing embedded encoded bitstreams for newly acquired images into the combined memory freed by dynamic truncation of the previously stored and previously embedded encoded bitstreams for the multiple different images.

2. A system according to claim 1 wherein the image storage device comprises a digital camera.

3. A system according to claim 1 wherein the memory manager stores additional newly acquired images in the memory by dynamically increasing the amount of truncation for each one of the stored images and storing the additional newly acquired images in the memory freed from truncation of the stored images.

4. A system according to claim 3 wherein the memory manager truncates each one of the stored images by about the same amount.

5. A system according to claim 1 wherein the memory manager includes an image selector that tags images and then truncates the stored embedded coded bitstreams of the tagged images.

6. A system according to claim 1 wherein the memory manager is initialized with an image truncation value that limits how much each stored image is truncated.

7. A system according to claim 1 wherein the embedded coder comprises a Rate-Distortion Optimized Embedded (RDE) coder.

8. A system according to claim 1 including a decoder coupled to the memory for decoding the truncated embedded coded bitstreams for the stored images.

9. A system according to claim 8 including a display coupled to the decoder for displaying the decoded images.

10. A system according to claim 1 wherein the memory manager includes a directory of images stored in memory, the memory manager truncating the stored images by changing pointers that identify which blocks in memory are linked to the stored images.

11. A method for dynamically changing the size and image quality of compressed images in a storage device comprising:

capturing one or more separately encoded different images;

encoding the captured images into compressed low-compression ratio bitstreams using an embedded coding scheme;

storing the images at the low compression ratio when there are only a few number of stored images;

providing user controllable image quality of the stored images by capturing a new image different from the previously stored images and encoding the newly captured image separately from the previously stored images; and interacting between previously encoded and stored images and new images where dynamic truncation is performed on the previously stored images to accommodate the new images by dynamically truncating the compressed bitstreams for the previously stored images only as much as necessary to make room for the newly captured image to minimize loss of image quality for the previously stored different images thereby dynamically varying image quality of the different images according to a number of stored images.

12. A method according to claim 11 wherein the embedded coding scheme allows arbitrary truncation of the compressed bitstreams without having to decode and reencode the stored images.

13. A method according to claim 11 wherein the stored images and the newly captured images are truncated only as much as necessary to fully fit the available storage space in the storage device.

14. A method according to claim 11 including compressing the newly captured images to fit into memory space truncated from the stored images.

15. A method according to claim 11 including the following:

selecting one or more of the stored images completely truncating the selected images;

truncating the newly captured image to a same size as the selected truncated images; and replacing the selected truncated images with the truncated newly captured image.

16. A method according to claim 11 including selecting a truncation threshold value and automatically truncating stored images to make room for the newly captured images until truncation for the stored images reaches the truncation threshold value.

17. A method for dynamically changing the size and image quality of compressed images in a storage device comprising:

capturing one or more images;

encoding the captured images into compressed low-compression ratio bitstreams using an embedded coding scheme;

storing the images at the low compression ratio when there are only a few number of stored images;

truncating the compressed bitstreams for the stored images only as much as necessary to make room for newly captured images to minimize loss of image quality for the stored images;

storing the images in multiple memory block sections;

linking the memory block sections for the same images together with pointers;

truncating the stored images by removing the pointers that link to one or more least significant memory block sections in each one of the stored images; and storing the newly acquired images in the memory block sections that are no longer linked to the stored images.

18. A system for managing the storage of multiple different images in an image storage device, comprising:

an embedded coder encoding the multiple different images into separate embedded encoded bitstreams;

memory storing the encoded bitstream for the multiple different images; and a memory manager dynamically varying truncation of the previously stored embedded encoded bitstreams for multiple ones of the different images and storing embedded encoded bitstreams for newly acquired images into the memory freed by dynamic truncation of the previously stored and previously embedded encoded bitstreams for the different images, the memory manager linking the memory block sections for the same images together with pointers; truncating the stored images by removing the pointers that link to one or more least significant memory block sections in each one of the stored images; and storing the newly acquired images in memory block sections that are no longer linked to the stored images.

* * * * *